United States Patent
Jarrell

[11] Patent Number: 5,897,172
[45] Date of Patent: Apr. 27, 1999

[54] WHEEL MOTOR COVER AND METHOD RELATED THERETO

[76] Inventor: Brett C. Jarrell, Rte. 1, Box 28A, Washington, W. Va. 26181

[21] Appl. No.: 08/872,422

[22] Filed: Jun. 10, 1997

[51] Int. Cl.$^6$ ...................................................... B60B 7/04
[52] U.S. Cl. ................................... 301/108.1; 301/37.35; 301/37.28
[58] Field of Search ............................. 301/37.1, 37.31, 301/37.34, 108.1, 108.2, 108.3, 108.4, 108.5, 6.3, 6.1, 6.5, 37.26, 37.27, 37.35, 37.36, 37.42; 180/65.5

[56] References Cited

U.S. PATENT DOCUMENTS

| D. 103,684 | 3/1937 | Le Jeune | D12/206 |
| 4,620,749 | 11/1986 | McEachern | 301/37.31 X |
| 4,760,891 | 8/1988 | Moss | 301/37.28 X |

FOREIGN PATENT DOCUMENTS

| 1244601 | 10/1986 | Japan | 301/6.3 |
| 9100197 | 1/1991 | WIPO | 301/37.26 |

*Primary Examiner*—Russell D. Stormer
*Attorney, Agent, or Firm*—Robert N. Blackmon

[57] ABSTRACT

The present invention involves a cover for an electric motor driven wheel of a vehicle. The cover comprises (a) an annular extension ring having a first lip and a second lip, (b) a cloth cap having (i) an annular first section slip fit over the second lip; and (ii) a top cap second section wherein the first section has at least one vent window therein for facilitating air flow, and (c) detachment clamps affixed to the ring adjacent the first lip for attaching the cover to the wheel. The present invention also involves a method for installing and replacing a cover for an electric motor driven wheel, the method involving providing the above wheel cover, installing the above wheel cover on an electric motor cover wheel, driving the vehicle, and replacing the wheel cover. The present wheel covers are light weight and easy to install. The invention also involves a wheel cover system comprising the above wheel cover and a plurality of cloth caps.

3 Claims, 2 Drawing Sheets

WHEEL MOTOR COVER AND METHOD RELATED THERETO

BACKGROUND OF THE INVENTION

1. Field of the Invention

The present invention relates to wheel covers, and more particularly relates to wheel motor covers 2. Description of the Related Art Various wheel covers and hubcaps have been previously disclosed For example, Moss U.S. Pat. No. 4,760,891 issued Aug. 2, 1988 titled Wheel Motor Cover, which is incorporated herein by reference, discloses a cover for electric motor in a vehicle wheel wherein the cover has a flexible, air and water impervious sheet material and has a disc like configuration to fit an opening in the wheel at the cooling air exit from the motor. Moss also discloses the presence of openings and protective covers on the cover. Zbykovskii, et al, Soviet Union Patent 569,778 discloses a mine car axle box cover fixing; Deer Great Britain Patent 1,075,709 published Jul. 12, 1967 discloses a hub cap comprising a molding of resilient synthetic resin composition optionally having textile fabric, glass fiber or other reinforcements incorporated in the composition; Rodionoff Great Britain Patent 469,632 published Jul. 29, 1937 discloses covers for hubs of motor vehicles, Cabanes French Patent 720,107 published Feb. 16, 1932 discloses a wheel cover for automobiles; Erns Australian Patent 219,983 published Sep. 11, 1958 discloses a wheel cap; Burckhardt, et al. U.S. Pat. No. 4,503,944 issued Mar. 12, 1985 discloses cover plate; Beith U.S. Pat. No. 3,726,566 issued Apr. 10, 1973 discloses a wheel cover; Reilly U.S. Pat. No. 3,149,883 issued Sep. 22, 1964 discloses a protective hub closure; Chase U.S. Pat. No. 2,299,796 issued Oct. 27, 1942 discloses a hub cap; Paddock U.S. Pat. No. 1,279,417 discloses a wheel guard; Smith U.S. Pat. No. 1,130,207 issued Mar. 2, 1915 discloses a wheel guard; Clark U.S. Design Pat. No. 303,649 issued Sept. 26, 1989 discloses a hub cap having a cloth center; Jeune U.S. Design Pat. No. 103,684 issued Mar. 23, 1937 discloses a wheel; Horn U.S. Pat. No. 2,526,026 issued Oct. 17, 1950 discloses a wheel cover attachment clip; Foster U.S. Pat. No. 3,619,010 issued Nov. 9, 1971 discloses plastic hub cap; Clark U.S. Pat. No. 3,863,949 issued Feb. 4, 1975 discloses a tire splash guard; Hampshire U.S. Pat. No. 3,918,762 issued Nov. 11, 1975 discloses a vehicle wheel cover; Lindhover, et al. U.S. Pat. No. 5,024,488 issued Jun. 18, 1981 discloses a hub cover assembly; Lederman U.S. Pat. No. 5,195,807 issued Mar. 23, 1993 discloses a venting wheel bearing end cap; Koyama, et al. U.S. Pat. No. 5,277,479 issued Jan. 11, 1994 discloses a resin wheel; Kuck U.S. Pat. No. 5,482,358 issued Jan. 9, 1996 discloses a vented plug for a hub cap; Denton U.S. Pat. No. 5,505,525 issued Apr. 9, 1996 discloses a hub cap; Arnot U.S. Pat. No. 3,608,661 issued Sep. 28, 1971 discloses a motorized wheel; Rogier U.S. Pat. No. 4,562,903 issued Jan. 7, 1996 discloses a wheel hub enclosed by a cover; Rogier, et al. U.S. Pat. No. 4,610,331 issued Sept. 9, 1986 discloses a wheel hub having a cover; Ruspa U.S. Pat. No. 4,889,394 issued Dec. 26, 1989 discloses a wheel cover disc; Sakurai, et al, U.S. Pat. No. 4,913,258 issued Apr. 3, 1990 discloses electric vehicle having covers; Atwood International Patent Application W087/00802 published Feb. 12, 1987 discloses wheel covers; and Dubost European Patent 409,686 published Jan. 23, 1991 discloses a detachable vehicle hub cap, all of which are incorporated herein by reference.

Each of the above hub cap covers has one or more of the following disadvantages and/or problems: (a) difficulty in attachment and detachment for quick replacement; (b) lack of easy repair and/or replacement; (c) excessive weight; and/or (d) excessive replacement and/or repair costs.

Consequently, there is a need for a wheel cover for electric motor driven wheels which permits easy repair, replacement, detachment and installation as well as being light weight.

SUMMARY OF THE INVENTION

The present invention involves a cover for an electric motor driven wheel of a vehicle. The cover comprises (a) an annular extension ring having a first lip and a second lip, (b) a cloth cap having (i) an annular first section slip fit over the second lip; and (ii) a top cap section, wherein the annular first section has at least one vent window therein for facilitating air flow, and (c) detachment clamps affixed to the ring (adjacent the first lip) for attaching the cover to the wheel. The present invention also involves a method for installing and replacing a cover for an electric motor driven wheel, the method involving providing the above wheel cover, installing the above wheel cover on an electric motor wheel, driving the vehicle, and replacing the wheel cover.

The present wheel covers are light weight and easy to install. The invention also involves a wheel cover system comprising the above wheel cover and a variety of cloth caps.

DETAILED DESCRIPTION OF THE INVENTION

Figure 1:
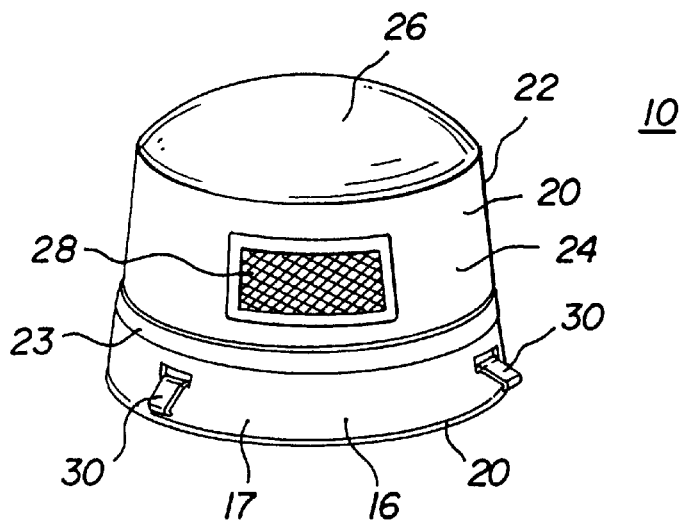
FIG. 1 is a perspective view of a wheel cover according to the present invention.
Figure 2:
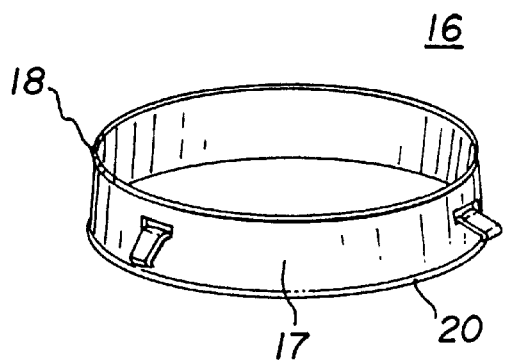
FIG. 2 is a perspective view of an extension ring of the wheel cover of FIG. 1.
Figure 3:
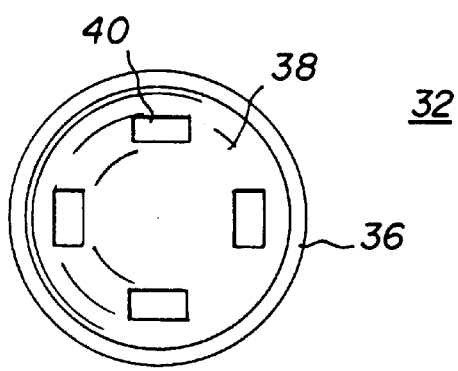
FIG. 3 is a top plan view of a wheel brake cover element according to the present invention.
Figure 4:
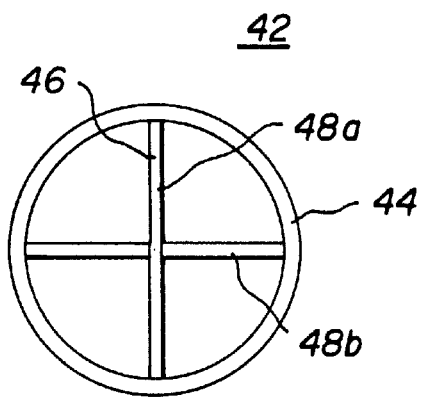
FIG. 4 is a top plan view of a brace element according to the present invention.
Figure 5:
FIG. 5 is a side elevational view of the cover element of FIG. 3.
Figure 6:
FIG. 6 is a side elevational view of the base element of FIG. 4.
Figure 7:
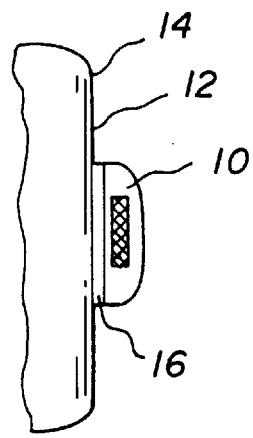
FIG. 7 is a front elevational view of the cutaway view of a vehicle wheel having a cover according to the present invention installed thereon.
Figure 8:
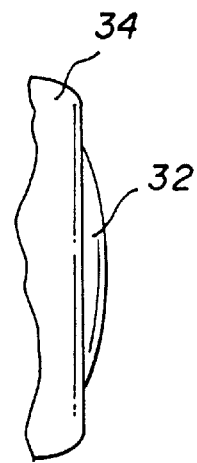
FIG. 8 is a cutaway elevational view of a vehicle wheel having the brake cover element of the present invention thereon.

As best shown in FIG. 1, a cover (10) is provided for an electric motor driven wheel (12) (rear wheel (12)) of a vehicle (14) as best shown in FIG. 7. The cover (10) comprises (a) an annular extension ring (16), as best shown in FIGS. 1 and 2, having and annular body (17), a first lip (18) located at the exterior region of the annular extension ring (body(17)) and a second lip (20) located at interior base region of the annular extension ring (16) (body (17)). Cover (10) further comprises a cloth cap (22) having (i) an annular first section (24) slip fit over the first lip (18) for secure attachment of the cloth cap to the annular extension ring (16). The cloth cap comprises a top cap second section (26) which extends across on end of the annular first section (24).

The annular first section (24) has at least one vent window (28) therein for facilitating air flow to and from the electric motor (now shown) covered by the cover (10) to the environmental atmosphere The cover (10) further comprises attachment clamps (30) affixed to the annular extension ring (16) adjacent to the first lip (18) (between the first lip and the second lip on the radially outward exterior surface of the ring (16) (body (17)) for attaching the cover (10) to the wheel (12).

Figure 9:
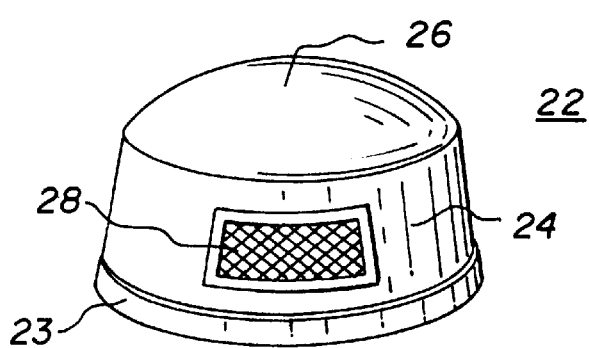
FIG. 9 is a perspective view of a cap of the cover according to the present invention.

The present invention also involves a wheel cover system comprising the cover (10) as set out above and a plurality of caps (22) for replacement of the original cap when it through use has been damaged. The ability of the caps to be easily replaced on the extension ring allows for simple and inexpensive replacement of damaged covers rather than the expensive replacement of the entire unit, particularly in situations where fiber glass cover units were originally utilized. As best shown in FIGS. 1 and 9, the cap (22) may have a circular elastic attachment band (23) about the perimeter of the base of the cape so that when the cap (22) is slip fit over the first lip (18), the elastic band (23) will be adjacent the fist lip. The elastic band (23) can be useful for slipping over first lip and being secured thereby to the ring during use. In the event of the cap (22) being damaged, the cap may be easily replaced, and optionally an adhesive material (glue, epoxy) may be used in conjunction with the cap for providing a greater level of affixing force to the cap relative to the ring.

The present invention also involves a method for quick and easy installation of caps and replacement of caps, the method comprising installation of the above cover, driving of the wheeled vehicle, detachment of the cover from the wheel, then detachment of the cap from the cover and attachment of a new cap to the ring element of the cover.

The present invention further involves a cover element (32) as best shown in FIGS. 3, 4, 5 and 6 and 8 for covering the front wheel of the powered vehicles having front wheel brakes which need covering. The cover element (32) may be attached to the front wheel (34) with attachment bolts (not shown) as are typically present on such front wheels. The cover element (32) includes a support ring (36) having a cloth covering (38) thereon and a plurality of windows (40). A brace element (42) is also provided comprising a brace ring (44) and a convex support frame (46) (convex cross) comprising a plurality of arcuate elongated brace members (48) (a,b).

In use, the cover (10) is placed onto the wheel over the electric motor area and is attached thereto utilizing the attachment clamps (30). The vehicle is then driven and adequate ventilation is provided to the electric motor by the presence of the vent windows (28). During utilization, it is possible that the cap (22) will become sufficiently worn to require replacement At which point, the entire cover (10) can quickly and easily be detached and replaced as a whole or may be inexpensively repaired by replacement of the cap (22) with an alternative cap (22) by removing damaged cap from over the first lip and replacing a new cap onto the extension ring by slip fitting the new cap over the first lip.

The braking elements on the front wheels (34) of such electric vehicles may be protected by cover element (32) and brace element (42) being utilized in combination by attachment to the front wheel (34).

The fabric material utilized (for the cap (22) or for the cover element (32) may be a canvas material, as preferably material exhibiting a high degree of resistance. The ring preferably a metallic ring such as one made out of steel but optionally may be made an impact plastic material for further reducing the weight of the item

What is claimed is:

1. A cover for an electronic motor driven wheel of a wheeled vehicle, the cover comprising:
    (a) an annular extension ring having a first lip and a second lip;
    (b) a cloth cap having (i) an annular first section slip fit over the second lip and (ii) a top cap second section attached to said first sections, said cap having at least one vent window therein for facilitating air flow;
    (c) attachment clamps affixed to said ring body adjacent to said first lip for attaching said cover to said wheel.

2. A wheel cover system comprising:
    (a) a cover comprising:
        (A) an annular extension ring having a first lip and a second lip;
        (B) a cloth cap having (i) an annular first section slip fit over the second lip and (ii) a top cap second section, said annular first section having at least one vent window therein for facilitating air flow;
        (C) attachment clamps affixed to said ring adjacent to said first lip for attaching said cover to said wheel; and
    (b) a plurality of caps.

3. A method for installation and replacement of a cover for an electric motor driven wheel of a wheeled vehicle, said method comprising
    (A) providing a cover comprising:
    (A) an annular extension ring having a first lip and a second lip;
    (B) a cloth cap having (i) an annular first section slip fit over the second lip and (ii) a top cap second section, said annular first section having at least one vent window therein for facilitating air flow;
    (C) attachment clamps affixed to said ring adjacent to said first lip for attaching said cover to said wheel
    (b) installing said cover onto said wheel,
    (c) driving said vehicle, and
    (d) replacing said of said cover.

* * * * *